United States Patent [19]

Hayden et al.

[11] Patent Number: 5,077,240

[45] Date of Patent: Dec. 31, 1991

[54] STRENGTHENABLE, HIGH NEODYMIUM-CONTAINING GLASSES

[75] Inventors: Yuiko Hayden; David Krashkevich, both of Duryea, Pa.

[73] Assignee: Schott Glass Technologies, Inc., Duryea, Pa.

[21] Appl. No.: 463,226

[22] Filed: Jan. 11, 1990

[51] Int. Cl.$^5$ .................. C03C 3/076; C03C 3/105; C03C 3/083; C03C 3/085

[52] U.S. Cl. .................... 501/67; 501/11; 501/55; 501/62; 501/65; 501/68; 501/69; 313/110; 313/116

[58] Field of Search ............ 501/13, 4, 64, 46, 11, 501/65, 78, 79, 53, 55, 60, 62, 65, 67, 68, 69; 313/110, 114, 116

[56] References Cited

U.S. PATENT DOCUMENTS

| | | | |
|---|---|---|---|
| 3,357,876 | 12/1967 | Rinehart | 161/2 |
| 3,947,281 | 3/1976 | Bacon | 106/52 |
| 3,997,249 | 12/1976 | Krohn et al. | 351/166 |
| 4,012,131 | 3/1977 | Krohn et al. | 351/159 |
| 4,022,628 | 5/1977 | Deeg | 106/52 |
| 4,036,623 | 7/1977 | Deeg et al. | 65/30 E |
| 4,248,732 | 2/1981 | Myers et al. | 252/301.6 P |
| 4,288,250 | 9/1981 | Yamashita | 501/78 |
| 4,376,829 | 3/1983 | Daiku | 501/64 |
| 4,390,637 | 6/1983 | Daiku | 501/64 |
| 4,521,524 | 6/1985 | Yamashita | 501/64 |
| 4,769,347 | 9/1988 | Cook et al. | 501/64 |
| 4,798,768 | 1/1989 | Oversluizen et al. | 428/426 |
| 4,891,336 | 1/1990 | Prassas | 501/13 |

OTHER PUBLICATIONS

W. D. Kingery, et al., "Introduction to Ceramics", Second Edition, 1976, 841–844.
Abstract J-OS 86 083 644.
J. S. Stroud, glass Technology, vol. 29, No. 3, Jun. 1988, pp. 108–114.

*Primary Examiner*—William R. Dixon, Jr.
*Assistant Examiner*—Michael A. Marcheski
*Attorney, Agent, or Firm*—Millen, White & Zelano

[57] ABSTRACT

A strengthened high $NdO_3$-containing glass has the composition of, in weight percent

| | |
|---|---|
| $SiO_2$ | 40–60 |
| $Nd_2O_3$ | 10–30 |
| $As_2O_3/Sb_2O_3$ | 0–1 |
| $B_2O_3$ | 5–15 |
| $Na_2O$ | 3–18 |
| ZnO | 0.1–10 |
| $Li_2O$ | 0–3 |
| $K_2O$ | 0–3 |
| $Al_2O_3$ | 0–7 |
| PbO | 0–15 |
| MgO | 0–3 |
| CaO | 0–3 |
| BaO | 0–3 |
| SrO | 0–3 |
| $\Sigma V_2O_5$, $Cr_2O_3$, $Mn_2O_3$, $Fe_2O_3$, CoO, NiO, CuO | 0–7 |
| $TiO_2$ | 0–5 |
| $Pr_6O_{11}$ | 0–1. |

37 Claims, No Drawings

STRENGTHENABLE, HIGH NEODYMIUM-CONTAINING GLASSES

CROSS-REFERENCE TO RELATED APPLICATION

This application is related to U.S. patent application Ser. No. 07/463,225 (Atty. Dkt. SGT 15), now U.S. Pat. No. 5,039,631 issued Aug. 13, 1991 which is entirely incorporated by reference herein.

BACKGROUND OF THE INVENTION

This invention relates to strengthenable glasses having a high neodymium content.

Various glasses are known having relatively high neodymium oxide contents. For example, the following United States patents disclose glasses having amounts of neodymium which can exceed about 10 wt.%: U.S. Pat. Nos. 4,521,524 (contrast enhancement filters); 4,288,250 (contrast enhancement filters); 4,769,347 (contrast enhancement filters); and 3,947,281 (high modulus glasses). Also known are glasses having contents up to about 10 wt.% of neodymium such as U.S. Pat. Nos. 4,376,829 (cathode ray tube glass) and 4,390,637 (cathode ray tube glass). However, no discussion of strengthenability of these glasses is given.

Of course, strengthening of glasses per se has long been known for various glasses such as crown glasses. See, e.g., J. S. Stroud, *Glass Technology*, Vol. 29, No. 3, June 1988, 108-114, and U.S. Pat. Nos. 4,036,623; 4,022,628; and 4,012,131, wherein ZnO is used to enhance chemstrengthening in conventional ophthalmic glasses. Chemstrengthenability of a glass containing 15-35 wt.% of $La_2O_3$ is also known (U.S. Pat. No. 3,997,249).

However, a need exists for further improvements and particularly for development of a high neodymium oxide-containing glass which is satisfactorily strengthenable, chemically or physically.

SUMMARY OF THE INVENTION

This invention relates to high $Nd_2O_3$-containing glasses, e.g., particularly for ophthalmic uses, which have an excellent capability for chemical strengthening and physical strengthening.

Thus, in one aspect, this invention relates to a glass composition having the following components:

TABLE 1

| | Compositions in Weight Percent* | | |
|---|---|---|---|
| | General | Preferred | Most Preferred |
| $SiO_2$ | 40-60 | 45-60 | 50-55 |
| $Nd_2O_3$ | 10-30 | 20-30 | 22-26 |
| $As_2O_3/Sb_2O_3$ | 0-1 | 0-0.5 | 0.2-0.4 |
| $B_2O_3$ | 5-15 | 5-10 | 6-8 |
| $Na_2O$ | 3-18 | 10-15 | 11-13 |
| ZnO | 0.1-10 | 1-7 | 2-5 |
| $Li_2O$ | 0-3 | 0 | 0 |
| $K_2O$ | 0-3 | 0 | 0 |
| $Al_2O_3$ | 0-7 | 0 | 0 |
| PbO | 0-15 | 0 | 0 |
| MgO | 0-3 | 0 | 0 |
| CaO | 0-3 | 0 | 0 |
| BaO | 0-3 | 0 | 0 |
| SrO | 0-3 | 0 | 0 |
| $\Sigma V_2O_5, Cr_2O_3, Mn_2O_3$ $Fe_2O_3$, CoO, NiO, CuO | 0-7 | 0 | 0 |
| $TiO_2$ | 0-5 | 0 | 0 |
| $Pr_6O_{11}$ | 0-1 | 0 | 0 |

*0 (zero) amounts refer to essentially 0, i.e., no positive additions of these components. Occasionally, trace amounts may be unavoidably included due to batch component impurities.

TABLE 2

| | Calculated Compositions in Mole Percent* | | |
|---|---|---|---|
| Oxide/Mole % | General | Preferred | Most Preferred |
| $SiO_2$ | 54-75 | 60-70 | 65-70 |
| $Nd_2O_3$ | 3-6 | .5-6 | 5.4-5.6 |
| $As_2O_3/Sb_2O_3$ | 0-0.4 | 0-0.2 | 0-0.2 |
| $B_2O_3$ | 5-17 | 5-10 | 6-9 |
| $Na_2O$ | 3-18 | 10-18 | 15-17 |
| ZnO | 0.1-10 | 1-7 | 2-4 |
| $Li_2O$ | 0-3 | 0 | 0 |
| $K_2O$ | 0-3 | 0 | 0 |
| $Al_2O_3$ | 0-7 | 0 | 0 |
| PbO | 0-4 | 0 | 0 |
| MgO | 0-3 | 0 | 0 |
| CaO | 0-3 | 0 | 0 |
| BaO | 0-3 | 0 | 0 |
| SrO | 0-3 | 0 | 0 |
| $\Sigma V_2O_5, Cr_2O_3, Mn_2O_3$ $Fe_2O_3$, CoO, NiO, CuO | 0-7 | 0 | 0 |
| $TiO_2$ | 0-5 | 0 | 0 |
| $Pr_6O_{11}$ | 0-0.5 | 0 | 0 |

*0 (zero) amounts refer to essentially 0, i.e., no positive additions of these components. Occasionally, trace amounts may be unavoidably included due to batch component impurities.

These glasses are useful for all applications wherein a high-$Nd_2O_3$ content glass is useful, e.g., as a contrast enhancement glass, e.g., for sunglasses, having particular applicability for users where high contrast is an advantage, e.g., for shooters or hunters, as filters, especially CRT filters, e.g., in accordance with conventional procedures, e.g., per the references cited above, etc. "Contrast enhancement" refers primarily to absorption by the glass of more background radiation than object radiation.

In another aspect, this invention relates to a glass having the composition given above, except also containing an amount of $CeO_2$ in the range of 0.1-2 wt.% (0.05-1.0 mole %), preferably in the range of 0.1-1 wt.% (0.05-0.5 mole %), and most preferably in the range of 0.4-0.6 wt.% (0.2-0.3 mole %). When cerium is present, the maximum amount of $As_2O_3/Sb_2O_3$ should be 0.3 wt.% to avoid unacceptable solarization. The cerium oxide also acts as a refining agent. Ce-containing glasses, for example, are useful as UV-attenuated glasses. For example, they achieve 99 percent UV attenuation at a wavelength of 350 nm.

As also discussed below, the glasses can optionally contain coloring-effective amounts of conventional colorants, whereby the glasses can be employed as color enhancement filters also, i.e., as filter glasses for the visible region.

The strengthenability of the glasses of this invention is achieved very advantageously, despite the high $Nd_2O_3$ contents by the compositional features, for example, regarding inclusion of ZnO and $Na_2O$, and exclusion of $K_2O$, inter alia.

If the amount of sodium oxide is less than 3 wt.%, then unsatisfactory strengthening, especially chemical strengthening, will be obtained. If the amount of sodium oxide is greater than 18 wt.%, devitrification increases. Also, the resultant melt can unacceptably attack the refractory material of the melt tank. Other end point amounts for the sodium oxide weight percent range are 3, 4, 5, 6, 7, 8, 9, 10, 11, 12, 13, 14, 15, 16, 17, and 18.

It has been found, surprisingly, that, even in this high Nd content system, zinc oxide is effective in assisting the ion exchange process as is known for conventional ophthalmic glasses. (See, e.g., U.S. Pat. No. 4,012,131.) When less than 0.1 wt.% is included, the resultant chemstrengthenability is less preferred. In addition, devitrification increases and chemical durability is lowered. Preferably, the amount of ZnO is at least 0.2 wt.%. When amounts of ZnO greater than 10 wt.% are included, unsatisfactory phase separation occurs. Other end point limits for ZnO include 1, 2, 3, 4, 5, 6, 7, 8, 9, and 10 wt.%.

It is also important that the amount of $K_2O$ be 0–3 wt.%. If an amount greater than 3 wt.% is included, the chemstrengthening process is adversely affected. For example, the modulus of rupture (MOR (nm/cm)) becomes worse. Alternative end point wt.% limits for $K_2O$ include 0.5, 1, 1.5, 2, 2.5, and 3.

Similarly, if the amounts of CaO, BaO, or SrO exceed 3 wt.%, there will be an adverse influence on the chemstrengthenability of the glass by interference effects during the chemstrengthening process. For example, depth of layer (DOL ($\mu$m)) and/or MOR worsen. It has been noted, however, that at higher CaO contents in this range, the adverse effects on the ion exchange process can be offset by the addition of relatively larger amounts of ZnO and/or MgO within the ranges given herein. Alternative weight percent end points for each of these components include 0.5, 1, 1.5, 2, 2.5, and 3.

Amounts of MgO greater than 3 wt.% cause an unfavorable increase in the melting temperature. Alternative weight percent end point limits for MgO include 0.5, 1, 1.5, 2, 2.5, and 3.

Inclusion in the glasses of this invention of amounts of PbO greater than 15 wt.% also will cause effects unacceptably interfering with the chemstrengthening process, e.g., worsening DOL and/or MOR. Alternative end point weight percent limits for this ingredient include 0, 1, 2, 3, 4, 5, 6, 7, 8, 9, 10, 11, 12, 13, 14, and 15 wt.%. In glasses including $CeO_2$, Ti-Ce and Pb-Ce can form a color center which will shift some of the color effects. Where these effects are unacceptable, of course, less Ti and less Pb, respectively, should be employed within the range of this invention.

Amounts of $Li_2O$ greater than 3 wt.% cause undesirable crystallization of the glass, i.e., devitrification instability. Alternative end point weight percent limits for this component include 0.5, 1, 1.5, 2 and 2.5 wt.%.

Amounts of $Al_2O_3$ greater than 7 wt.% cause unacceptable melting difficulties. Alternative end point weight percent limits for this glass component include 1, 2, 3, 4, 5, 6, and 7.

For glasses not containing $CeO_2$, the total amount of the refining agents $As_2O_3$ and/or $Sb_2O_3$ should be at most 1 wt.%. An especially preferred amount is about 0.3 wt.%. When $CeO_2$ is present, the permissible amounts of $As_2O_3/Sb_2O_3$ are significantly lowered due to an incompatibility causing solarization. Thus, with $CeO_2$ present, the amount of $As_2O_3/Sb_2O_3$ is 0–0.3 wt.%, preferably 0 wt.%.

When amounts of network former $SiO_2$ less than about 40 wt.% are included, unacceptable devitrification occurs. When amounts greater than 60 wt.% are included, maximum Nd content and/or chemstrengthenability are adversely affected. Alternative end point weight percent limits for this ingredient include 40, 41, 42, 43, 44, 45, 46, 47, 48, 49, 50, 51, 52, 53, 54, 55, 56, 57, 58, 59, and 60 wt.%.

When amounts of $Nd_2O_3$ less than 10 wt.% are included, unsatisfactory contrast enhancement is achieved. When amounts greater than 30 wt.% are included, devitrification is unacceptable. Alternative end point weight percent limits for this ingredient include 10, 11, 12, 13, 14, 15, 16, 17, 18, 19, 20, 21, 22, 23, 24, 25, 26, 27, 28, 29, and 30.

When amounts of the fluxing agent $B_2O_3$ less than about 5 wt.% are included, meltability is unacceptable. When amounts greater than about 15 wt.% are included, phase separation occurs and devitrification is unacceptable. Alternative end point weight percent limits for this ingredient include 5, 6, 7, 8, 9, 10, 11, 12, 13, 14, and 15.

The minimum amount for effective UV attenuation of $CeO_2$ is typically about 0.1 wt.%, most preferably at least 0.5 wt.%. When amounts of this UV-attenuator greater than 2 wt.% are included, the maximum permissible amount of Nd is lowered. Alternative end point weight percent limits include 0, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, and 2.0. An especially preferred amount is about 0.5 wt.%. When Pb and/or Ti is also present in the glass, UV-attenuation can also be achieved by Ce/Pb and/or Ce/Ti combinations.

When amounts of $TiO_2$ or $Pr_6O_{11}$ greater than 5 wt.% and 1 wt.%, respectively, are included, color mismatches may occur. This is an important effect for the applications of the glass of this invention where color is important, e.g., in contrast enhancement applications for cosmetic reasons and in color filter applications for obvious reasons.

For many applications of the glasses of this invention, additional colorants will not be desired, e.g., where the inherent coloration (purplish) caused by the neodymium oxide content is satisfactory per se. Amounts of conventional colorants can still be included, as long as the amounts of each are less than those wherein each ingredient is effective as a major colorant. Typically, such amounts will be as follows for several conventional colorants:

TABLE 3

|  | Wt. %* |
| --- | --- |
| $Cr_2O_3$ | <0.005 |
| CuO | <0.02 |
| MnO | <0.02 |
| CoO | <0.0005 |
| $Fe_2O_3$ | <0.035 |
| NiO | <0.02 |
| $TiO_2$ | <5.0 |
| $V_2O_5$ | <0.02 |
| $Er_2O_3$ | <0.1 |

*Amounts generally too low for effective coloring effects, e.g., amount permitted as impurities.

Of course, where the coloring effect of such conventional additives is desired, an effective amount greater than those stated above can routinely be employed. Typically, the upper limit on the amount of each colorant will be routinely chosen, e.g., for cosmetic and performance reasons with respect to the final color produced, as long as there is no adverse effect on the important properties of the glass of this invention. Typically, the total amount of all colorant additives will be less than 7 wt.%, preferably less than 5 wt%, unless indicated otherwise herein. Normally, that component will be exchanged for neodymium on an ion for ion basis. Suitable colorants include those listed in Table 3. Their use to custom contour the spectral response of the glass is analogous to U.S. Pat. No. 4,769,347 and 4,521,524.

Contents of $Pr_6O_{11}$ in the glasses of this invention will typically occur due to unavoidable impurities in the $Nd_2O_3$ which is commercially available. For example, for 95 percent pure $Nd_2O_3$, the resultant impurity content in the glasses of this invention will typically be in the range of about 1.9-3.7 wt.%. This is equivalent to an addition to the glass containing absolutely pure $Nd_2O_3$ of about 0.9 wt.% $Pr_6O_{11}$.

When the glasses of this invention are employed as contrast enhancement eyeglass lenses, they are preferably shaped conventionally into a suitable form for use and conventionally combined with typical eyeglass frames. When employed as color enhancement filters, similar processing can be employed. Similarly, conventional processing can be used to work up the glasses for use as CRT filters. The latter will typically be designed for the typical CRT phosphor emission lines, P-22 and P-43. See, e.g., U.S. Pat. No. 4,769,347.

In view of the unique combination of ingredients given above, the glasses of this invention can be very well chemstrengthened using conventional techniques such as those mentioned in the Stroud and other references, above. Typically, a crown-bath solution can be used, e.g., 99.5 percent $KNO_3$ and 0.5 percent silicic acid, at a temperature in the range of about 480°-550° C. for an exchange time of, e.g., 16 hours or in the range of 8-24 hours. Typically, a preferred exchange temperature will be approximately 30° lower than the strain temperature of the glass. Determination of optimum chemstrengthening layer thicknesses can be effected routinely. Typically, acceptable thicknesses of a chemstrengthened layer will be above 30 μm, preferably about 50 μm; however, narrower and larger thicknesses are fully included. Typical surface compression values achievable are about 1600-2200 nm/cm.

Strengthening by physical tempering can also be very advantageously performed in conjunction with the glasses of this invention. A suitable procedure involves hot air blowing at about 700° C. to $T_g$° C.+100°, followed by room temperature air blowing for quenching. Typically, the hot air treatment lasts for about 2-3 minutes.

The glasses of this invention can be prepared routinely by using normal batch components corresponding to the above-mentioned oxides, followed by conventional melting in an appropriate crucible, e.g., a platinum or quartz crucible, e.g., at melt temperatures of, for example, 1300°-1450° C. A general rule of thumb for suitable conditions for air hardening is that temperatures should be about $T_g$+100° C. and hot air soak should continue for one minute for every mm of sample thickness.

Preferred properties of the glasses of this invention include:

| λ | Transmission (%) | |
|---|---|---|
| | With UV Attenuation | Without UV Attenuation |
| 680 | <65 | <65 |
| 570-590 | <1 | <1 |
| 530 | <10 | <10 |
| 350 | <0.5 | <4 |
| $CTE_{20-300°\,C.}(\times 10^{-7})$ | <100 | <100 |

The CTE properties are particularly useful for physical tempering. As can be seen, the glasses have an absorption peak at 580 nm. They have essentially no absorption peak at 490 nm. These properties contribute toward their usefulness as CRT filters.

Without further elaboration, it is believed that one of ordinary skill in the art can, utilizing the preceding description, utilize the present invention to its fullest extent. The following preferred specific embodiments are, therefore, to be construed as merely illustrative and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire texts of all applications, patents, and publications, if any, cited above and below are hereby incorporated by reference.

TABLE 4

| | Examples | | | | | | | | | | | |
|---|---|---|---|---|---|---|---|---|---|---|---|---|
| | 1 | 2 | 3 | 4 | 5* | 6 | 7* | 8* | 9 | 10* | 11 | 12 |
| Oxide wt. % | | | | | | | | | | | | |
| $SiO_2$ | 56.80 | 54.82 | 51.16 | 43.01 | 20.52 | 40.01 | 33.01 | 25.01 | 51.16 | 46.00 | 49.16 | 53.11 |
| $Nd_2O_3$ | 14.70 | 20.54 | 27.99 | 27.99 | 54.0 | 27.99 | 27.99 | 27.99 | 27.99 | 27.99 | 27.99 | 24.02 |
| $As_2O_3$ | 0.30 | 0.29 | 0.27 | 0.27 | 0.2 | 0.27 | 0.27 | 0.27 | 0.27 | 0.27 | 0.27 | 0.28 |
| BaO | 3.00 | | | | | | | | | | | |
| $B_2O_3$ | 7.60 | 7.34 | 6.85 | 15.00 | 9.72 | 15.00 | 22.00 | 30.00 | | | | 7.11 |
| $Na_2O$ | 14.62 | 14.10 | 13.16 | 13.16 | | 13.16 | 13.16 | 13.16 | 13.16 | 13.16 | 13.16 | 13.67 |
| ZnO | 3.00 | 2.90 | 0.57 | 0.57 | | 0.57 | 0.57 | 0.57 | 0.57 | 0.57 | 0.57 | 1.81 |
| $Al_2O_3$ | | | | | 12.96 | 3.00 | 3.00 | 3.00 | 6.85 | 12.01 | 6.85 | |
| $Li_2O$ | | | | | 2.70 | | | | | | 2.00 | |
| Oxides mol. % | | | | | | | | | | | | |
| $SiO_2$ | 67.93 | 67.93 | 67.93 | 57.98 | 39.69 | 54.84 | 45.85 | 35.28 | 69.64 | 64.47 | 65.13 | 67.93 |
| $Nd_2O_3$ | 3.14 | 4.54 | 6.63 | 6.73 | 14.85 | 6.84 | 6.94 | 7.04 | 6.80 | 7.00 | 6.62 | 5.48 |
| $As_2O_3$ | 0.11 | 0.11 | 0.11 | 0.11 | 0.12 | 0.11 | 0.11 | 0.12 | 0.11 | 0.11 | 0.11 | 0.11 |
| BaO | 1.40 | | | | | | | | | | | |
| $B_2O_3$ | 7.83 | 7.84 | 7.84 | 17.43 | 16.21 | 17.73 | 26.35 | 36.49 | | | | 7.84 |
| $Na_2O$ | 16.93 | 16.93 | 16.93 | 17.18 | | 17.47 | 17.70 | 17.98 | 17.35 | 17.86 | 16.89 | 16.93 |
| ZnO | 2.65 | 2.65 | 0.56 | 0.57 | | 0.58 | 0.58 | 0.59 | 0.58 | 0.54 | 0.56 | 1.71 |
| $Al_2O_3$ | | | | | 14.85 | 2.44 | 2.47 | 2.51 | 5.52 | 9.97 | 5.37 | |
| $Li_2O$ | | | | | 10.49 | | | | | | 5.32 | |
| Stability | Good | Good | PBA† | PBA† | Poor | PBA† | Poor | Poor | PBA† | Didn't Even Melt | PBA† | PBA† |

*Comparative
†Poor but acceptable

TABLE 4-continued

| | Examples | | | | | | | | | | | |
|---|---|---|---|---|---|---|---|---|---|---|---|---|
| | 13 | 14 | 15 | 16 | 17 | 18 | 19 | 20 | 21 | 22 | 23 | 24 |
| Oxide wt. % | | | | | | | | | | | | |
| $SiO_2$ | 53.0 | 46.48 | 51.79 | 52.59 | 53.66 | 53.11 | 53.39 | 51.79 | 49.94 | 51.53 | 49.69 | 52.72 |
| $Nd_2O_3$ | 24.05 | 22.32 | 22.28 | 23.87 | 22.14 | 24.02 | 23.04 | 23.03 | 22.90 | 22.91 | 22.79 | 22.75 |
| $As_2O_3$ | 0.28 | 0.26 | 0.29 | (1.02) ($CeO_2$) | (1.04) ($CeO_2$) | 0.28 | (0.52) ($CeO_2$) | (0.52) ($CeO_2$) | (0.52) ($CeO_2$) | (0.52) ($CeO_2$) | (0.51) ($CeO_2$) | (0.51) ($CeO_2$) |
| BaO | | | | | | | | | | | | |
| $B_2O_3$ | 6.23 | 6.58 | 7.23 | 7.04 | 7.18 | 7.11 | 7.15 | 7.14 | 7.10 | 7.11 | 7.07 | 7.06 |
| $Na_2O$ | 13.64 | 12.64 | 12.24 | 11.81 | 13.15 | 13.08 | 13.08 | 14.70 | 14.62 | 13.01 | 12.94 | 10.51 |
| ZnO | 2.80 | 1.68 | 5.39 | 3.67 | 2.84 | 1.81 | 2.82 | 2.82 | 4.92 | 4.93 | 7.01 | 2.79 |
| $Al_2O_3$ | | | | | | | | | | | | |
| $Li_2O$ | | | 0.79 | | | | | | | | | |
| | | (10.04) (PbO) | | | | | | | | | | |
| $K_2O$ | | | | | | | | | | | | 3.65 |
| Oxides mol. % | | | | | | | | | | | | |
| $SiO_2$ | 67.93 | 64.20 | 65.14 | 67.93 | 67.93 | 67.93 | 67.93 | 65.93 | 63.93 | 65.93 | 63.93 | 67.93 |
| $Nd_2O_3$ | 5.50 | 5.50 | 5.00 | 5.50 | 5.00 | 5.50 | 5.23 | 5.23 | 5.23 | 5.23 | 5.23 | 5.23 |
| $As_2O_3$ | 0.11 | 0.11 | 0.11 | (0.46) ($CeO_2$) | (0.46) ($CeO_2$) | 0.11 | (0.23) ($CeO_2$) | (0.23) ($CeO_2$) | (0.23) ($CeO_2$) | (0.23) ($CeO_2$) | (0.23) ($CeO_2$) | (0.23) ($CeO_2$) |
| BaO | | | | | | | | | | | | |
| $B_2O_3$ | 6.88 | 7.84 | 7.84 | 7.84 | 7.84 | 7.84 | 7.84 | 7.84 | 7.84 | 7.84 | 7.84 | 7.84 |
| $Na_2O$ | 16.93 | 16.91 | 14.91 | 14.77 | 16.12 | 16.93 | 16.12 | 18.12 | 18.12 | 16.12 | 16.12 | 13.12 |
| ZnO | 2.65 | 1.71 | 5.00 | 3.50 | 2.65 | 1.71 | 2.65 | 2.65 | 4.65 | 4.65 | 6.65 | 2.65 |
| $Al_2O_3$ | | | | | | | | | | | | |
| $Li_2O$ | | | 2.00 | | | | | | | | | |
| | | (3.73) (PbO) | | | | | | | | | | |
| $K_2O$ | | | | | | | | | | | | 3.00 |
| Stability | Fair | Fair | PBA † | PBA † | Good | Good | Good | Fair | Fair | Fair | Fair | |

*Comparative
†Poor but acceptable

| | Properties | | | | | | | | | | |
|---|---|---|---|---|---|---|---|---|---|---|---|
| | 1 | 2 | 13 | 14 | 15 | 17 | 18 | 19 | 21 | 22 | 23 | 24 |
| Ion Exchange 530° C. 16 hr. | | | | | | | | | | | | |
| DOL (μm) | | 50 | | 41 | 40 | 48 | | 50 | 52 | 50 | 55 | <50 |
| MOR (nm/cm) | | 1642 | | 1280 | 1609 | 1612 | | 2061 | 1916 | 1771 | 2294 | <1770 |
| $n_d$ | 1.55 | 1.55947 | 1.56782 | | | | 1.56697 | 1.56659 | | | | |
| $CTE_{20-300} \times 10^{-7}/°C.$ | 92 | | | | | | 90.0 | 86.1 | | | | |
| Tg/°C. | 545 | | | | | | 582 | 576 | | | | |
| Ts/°C. | | | | | | | 721 | 723 | | | | |
| $\delta/gcm^{-3}$ | 2.86 | | | | | 2.98 | 2.99 | 2.99 | | | | |

| | 1 | 2 | 13 | 14 | 15 | 17 | 18 | 19 | 21 | 22 | 23 |
|---|---|---|---|---|---|---|---|---|---|---|---|
| Transmission (%) | | | | | | | | | | | |
| λ (nm) | | | | | | | | | | | |
| 770 | | | | | | | 49.0 | 51.5 | | | |
| 760 | | | | | | | 11.3 | 12.8 | | | |
| 750 | | | | | | | 0.6 | 0.7 | | | |
| 740 | | | | | | | 0.5 | 0.7 | | | |
| 730 | | | | | | | 35.1 | 36.1 | | | |
| 720 | | | | | | | 81.4 | 81.8 | | | |
| 710 | | | | | | | 87.5 | 87.6 | | | |
| 700 | | | | | | | 84.4 | 84.6 | | | |
| 690 | | | | | | | 63.8 | 65.5 | | | |
| 680 | | | | | | | 60.3 | 61.9 | | | |
| 670 | | | | | | | 78.4 | 79.0 | | | |
| 660 | | | | | | | 89.1 | 89.0 | | | |
| 650 | | | | | | | 89.7 | 89.6 | | | |
| 640 | | | | | | | 87.1 | 87.1 | | | |
| 630 | | | | | | | 79.1 | 79.8 | | | |
| 620 | | | | | | | 84.1 | 84.4 | | | |
| 610 | | | | | | | 48.0 | 52.2 | | | |
| 600 | | | | | | | 6.1 | 8.1 | | | |
| 590 | | | | | | | 0.2 | 0.2 | | | |
| 580 | | | | | | | 0.2 | 0.2 | | | |
| 570 | | | | | | | 0.8 | 0.8 | | | |
| 560 | | | | | | | 74.4 | 75.5 | | | |
| 550 | | | | | | | 80.4 | 81.2 | | | |
| 540 | | | | | | | 52.3 | 55.0 | | | |
| 530 | | | | | | | 4.3 | 5.7 | | | |
| 520 | | | | | | | 21.0 | 23.5 | | | |
| 510 | | | | | | | 21.5 | 24.2 | | | |
| 500 | | | | | | | 58.7 | 60.7 | | | |
| 490 | | | | | | | 79.6 | 80.1 | | | |
| 480 | | | | | | | 50.0 | 52.1 | | | |
| 470 | | | | | | | 49.8 | 51.7 | | | |
| 460 | | | | | | | 58.3 | 59.6 | | | |
| 450 | | | | | | | 74.8 | 75.3 | | | |

TABLE 4-continued

| | | |
|---|---|---|
| 440 | 75.6 | 75.8 |
| 430 | 43.1 | 44.8 |
| 420 | 85.5 | 83.6 |
| 410 | 89.6 | 85.8 |
| 400 | 89.5 | 83.3 |
| 390 | 89.2 | 78.8 |
| 380 | 87.9 | 70.2 |
| 370 | 90.0 | 57.0 |
| 360 | 4.0 | 1.5 |
| 350 | 1.0 | <0.5 |
| 340 | 48.0 | <0.5 |

*Comparative
Poor but acceptable

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A high Nd, chemically strengthenable glass consisting essentially of, in weight percent

| | |
|---|---|
| $SiO_2$ | 40-60 |
| $Nd_2O_3$ | 10-30 |
| $As_2O_3/Sb_2O_3$ | 0-1 |
| $B_2O_3$ | 5-15 |
| $Na_2O$ | 3-18 |
| ZnO | 2-10 |
| $Li_2O$ | 0-3 |
| $K_2O$ | 0-3 |
| $Al_2O_3$ | 0-7 |
| PbO | 0-2 |
| MgO | 0-3 |
| CaO | 0-2 |
| BaO | 0-2 |
| SrO | 0-2 |
| $\Sigma V_2O_5, Cr_2O_3, Mn_2O_3$ | 0-7 |
| $FeO_2O_3$, CoO, NiO, CuO | |
| $TiO_2$ | 0-5 |
| $Pr_6O_{11}$ | 0-1. |

2. A glass of claim 1 consisting essentially of, in weight percent

| | |
|---|---|
| $SiO_2$ | 45-60 |
| $Nd_2O_3$ | 20-30 |
| $As_2O_3/Sb_2O_3$ | 0-0.5 |
| $B_2O_3$ | 5-10 |
| $Na_2O$ | 10-15 |
| ZnO | 1-7 |
| $Li_2O$ | 0 |
| $K_2O$ | 0 |
| $Al_2O_3$ | 0 |
| PbO | 0 |
| MgO | 0 |
| CaO | 0 |
| BaO | 0 |
| SrO | 0 |
| $\Sigma V_2O_5, Cr_2O_3, Mn_2O_3$ | 0 |
| $Fe_2O_3$, CoO, NiO, CuO | |
| $TiO_2$ | 0 |
| $Pr_6O_{11}$ | 0 |

3. A glass of claim 1 consisting essentially of, in weight percent

| | |
|---|---|
| $SiO_2$ | 50-55 |
| $Nd_2O_3$ | 22-26 |
| $As_2O_3/Sb_2O_3$ | 0.2-0.4 |
| $B_2O_3$ | 6-8 |
| $Na_2O$ | 11-13 |
| ZnO | 2-5 |
| $Li_2O$ | 0 |
| $K_2O$ | 0 |
| $Al_2O_3$ | 0 |
| PbO | 0 |
| MgO | 0 |
| CaO | 0 |
| BaO | 0 |
| SrO | 0 |
| $\Sigma V_2O_5, Cr_2O_3, Mn_2O_3$ | 0 |
| $Fe_2O_3$, CoO, NiO, CuO | |
| $TiO_2$ | 0 |
| $Pr_6O_{11}$ | 0 |

4. A glass of claim 1 having a MgO content.

5. A glass of claim 1 having a $TiO_2$ content.

6. A glass of claim 1, wherein the amount of ZnO is 2-5 wt.%.

7. A glass of claim 1, wherein the amount of $K_2O$ is 0.

8. A glass of claim 1, wherein the amount of ZnO is 3-10 wt.%.

9. A glass of claim 1 having a chemically strengthened surface layer prepared by ion exchange.

10. A glass of claim 1 having a chemically strengthened surface layer prepared by ion exchange.

11. A glass of claim 3 having a chemically strengthened surface layer prepared by ion exchange.

12. A glass of claim 8 having a chemically strengthened surface layer prepared by ion exchange.

13. A chemically strengthenable glass consisting essentially of, in weight percent

| | |
|---|---|
| $SiO_2$ | 40-60 |
| $Nd_2O_3$ | 10-30 |
| $As_2O_3/Sb_2O_3$ | 0-0.3 |
| $B_2O_3$ | 5-15 |
| $Na_2O$ | 3-18 |
| ZnO | 2-10 |
| $Li_2O$ | 0-3 |
| $K_2O$ | 0-3 |
| $Al_2O_3$ | 0-7 |
| PbO | 0-2 |
| MgO | 0-3 |
| CaO | 0-2 |
| BaO | 0-2 |
| SrO | 0-2 |
| $\Sigma V_2O_5, Cr_2O_3, Mn_2O_3$ | 0-7 |
| $Fe_2O_3$, CoO, NiO, CuO | |
| $TiO_2$ | 0-5 |
| $Pr_6O_{11}$ | 0-1 |
| $CeO_2$ | 0.1-2 |

14. A glass of claim 13 consisting essentially of, in weight percent

| | |
|---|---|
| $SiO_2$ | 45-60 |
| $Nd_2O_3$ | 20-30 |
| $B_2O_3$ | 5-10 |
| $As_2O_3/Sb_2O_3$ | 0 |
| $Na_2O$ | 10-15 |
| ZnO | 1-7 |
| $Li_2O$ | 0 |
| $K_2O$ | 0 |
| $Al_2O_3$ | 0 |
| PbO | 0 |
| MgO | 0 |
| CaO | 0 |
| BaO | 0 |
| SrO | 0 |
| $\Sigma V_2O_5, Cr_2O_3, Mn_2O_3$ $Fe_2O_3$, CoO, NiO, CuO | 0 |
| $TiO_2$ | 0 |
| $Pr_6O_{11}$ | 0 |
| $CeO_2$ | 0.1-1. |

15. A glass of claim 13 consisting essentially of, in weight percent

| | |
|---|---|
| $SiO_2$ | 50-55 |
| $Nd_2O_3$ | 22-26 |
| $B_2O_3$ | 6-8 |
| $As_2O_3/Sb_2O_3$ | 0 |
| $Na_2O$ | 11-13 |
| ZnO | 2-5 |
| $Li_2O$ | 0 |
| $K_2O$ | 0 |
| $Al_2O_3$ | 0 |
| PbO | 0 |
| MgO | 0 |
| CaO | 0 |
| BaO | 0 |
| SrO | 0 |
| $\Sigma V_2O_5, Cr_2O_3, Mn_2O_3$ $Fe_2O_3$, CoO, NiO, CuO | 0 |
| $TiO_2$ | 0 |
| $Pr_6O_{11}$ | 0 |
| $CeO_2$ | 0.4-0.6. |

16. A glass of claim 13 having a MgO content.

17. A glass of claim 13 having a $TiO_2$ content.

18. A glass of claim 13, wherein the amount of ZnO is 2-5 wt.%.

19. A glass of claim 13, wherein the amount of $K_2O$ is 0.

20. A glass of claim 13, wherein the amounts of $K_2O$, CaO, BaO, SrO, and PbO are 0.

21. A glass of claim 13 having a chemically strengthened surface layer prepared by ion exchange.

22. A glass of claim 14 having a chemically strengthened surface layer prepared by ion exchange.

23. A glass of claim 15 having a chemically strengthened surface layer prepared by ion exchange.

24. A glass of claim 20 having a chemically strengthened surface layer prepared by ion exchange.

25. A contrast enhancement lens consisting essentially of a glass of claim 9 in the form of a lens.

26. A UV-attenuated lens consisting essentially of a glass of claim 21 in the form of a lens.

27. Sunglasses comprising a lens of claim 25.

28. Sunglasses comprising a lens of claim 26.

29. A glass of claim 1 having a strengthened surface layer prepared by heat treatment of a surface thereof followed by quenching.

30. A glass of claim 13 having a strengthened surface layer prepared by heat treatment of a surface thereof followed by quenching.

31. A CRT filter comprising a glass of claim 9.

32. A CRT filter comprising a glass of claim 21.

33. A high Nd, chemically strengthenable glass consisting essentially of, in mole%:

| | |
|---|---|
| $SiO_2$ | 54-75 |
| $Nd_2O_3$ | 3-6 |
| $As_2O_3/Sb_2O_3$ | 0-0.4 |
| $B_2O_3$ | 5-17 |
| $Na_2O$ | 3-18 |
| ZnO | 2-10 |
| $Li_2O$ | 0-3 |
| $K_2O$ | 0-3 |
| $Al_2O_3$ | 0-7 |
| PbO | 0-2 |
| MgO | 0-3 |
| CaO | 0-2 |
| BaO | 0-2 |

34. A chemically strengthenable glass consisting essentially of, in mole%:

| | |
|---|---|
| $SiO_2$ | 54-75 |
| $Nd_2O_3$ | 3-6 |
| $As_2O_3/Sb_2O_3$ | 0-0.4 |
| $B_2O_3$ | 5-17 |
| $Na_2O$ | 3-18 |
| ZnO | 2-10 |
| $Li_2O$ | 0-3 |
| $K_2O$ | 0-3 |
| $Al_2O_3$ | 0-7 |
| PbO | 0-2 |
| MgO | 0-3 |
| CaO | 0-2 |
| BaO | 0-2 |
| SrO | 0-2 |
| $\Sigma V_2O_5, Cr_2O_3, Mn_2O_3$ $Fe_2O_3$, CoO, NiO, CuO | 0-7 |
| $TiO_2$ | 0-5 |
| $Pr_6O_{11}$ | 0-0.5 |
| $CeO_2$ | 0.05-1.0. |

35. A method of chemically strengthening a surface of a silicate glass containing 10-30 wt.% of $Nd_2O_3$ and 3-18 wt.% of $Na_2O$ comprising chemstrengthening such a silicate glass with a composition further consisting essentially of 2-10 wt.% ZnO and less than 2 wt.% of each of $K_2O$, PbO, CaO, BaO, and SrO.

36. A glass of claim 1, wherein the amount of Nd is 18-30 wt.%.

37. A glass of claim 1, wherein the amounts of PbO, CaO, BaO and SrO are 0.

* * * * *